United States Patent [19]

Yamashita et al.

[11] Patent Number: 4,923,028
[45] Date of Patent: May 8, 1990

[54] REVERSE DRIVING DEVICE FOR AN AUTOBICYCLE

[75] Inventors: Shoji Yamashita; Atsuo Ohta; Yoshiaki Hirosawa, all of Saitama, Japan

[73] Assignee: Honda Giken Kogyo Kabushiki Kaisha, Tokyo, Japan

[21] Appl. No.: 163,697

[22] Filed: Mar. 3, 1988

[30] Foreign Application Priority Data

Mar. 20, 1987 [JP] Japan .................................. 62-64014

[51] Int. Cl.$^5$ ............................................. F60K 23/00
[52] U.S. Cl. .................................... 180/219; 180/65.2
[58] Field of Search ............... 180/219, 220, 221, 65.2, 180/75.1, 69.6

[56] References Cited

U.S. PATENT DOCUMENTS

3,211,249 10/1965 Papst ................................... 180/65.2
4,763,538 10/1988 Fujita et al. ................... 180/65.2 X Primary Examiner—David M. Mitchell
Attorney, Agent, or Firm—Lyon & Lyon

[57] ABSTRACT

An autobicycle is reversely driven by the driving force of a dedicated reverse driving motor so arranged as to be selectively drivingly connected or disconnected to the rear wheel of the vehicle. The arrangement is particularly adapted for retrofit on existing autobicycles equipped for only powered movement in the forward direction.

12 Claims, 8 Drawing Sheets

REVERSE DRIVING DEVICE FOR AN AUTOBICYCLE

BACKGROUND OF THE INVENTION

This invention relates to a driving motor located near the rear wheel of an autobicycle and operable to drive the autobicycle reversely without need for reverse operation of the forward driving engine.

A reverse driving device operable to drive an autobicycle reversely by utilizing the driving force of a starter motor for starting an engine is known, such device being shown and described in Japanese Patent Laid-Open No. 62-99292 resulting from a patent application filed in Japan on Oct. 25, 1985 by the applicant of the present patent application.

In the reverse driving device embodied in the preceding patent application, a reverse driving power transmission system is operably associated with a starter motor and the output shaft of a power unit, such that, when a reverse lever is operated to a non-reverse driving position, the reverse driving power transmission system is disengaged from the power unit output shaft, but, on the contrary, when the reverse lever is operated to a reverse driving position, the reverse driving power transmission system is connected to the output shaft of the power unit. Accordingly, this prior art reverse driving device requires a power transmission system for exclusive use for reverse driving of the autobicycle and change-over mechanism for the power transmission system. Furthermore, since the described power transmission system and change-over mechanism are integrally incorporated in a power unit, it is not easy to retrofit such a reverse driving device to existing autobicycles. It is to the amelioration of these problems, therefore, to which the present invention is directed.

SUMMARY OF THE INVENTION

The present invention accordingly relates to an improvement in reverse driving devices for autobicycles wherein such aforementioned problems are eliminated. More particularly, the invention relates to an improved reverse driving device incorporating a reverse driving motor positioned at a location near the rear wheel of the autobicycle and connected in the power transmission system to the rear wheel thereof. Accordingly, when the autobicycle is to be driven reversely, the reverse driving motor is driven to rotate the rear wheel of the autobicycle in the reverse direction.

For a better understanding of the invention, its operating advantages and the specific objectives obtained by its use, reference should be made to the accompanying drawings and description which relate to a preferred embodiment thereof.

DESCRIPTION OF THE PREFERRED EMBODIMENTS OF THE INVENTION

FIGS. 1 to 6 depict an embodiment of the present invention applied to an autobicycle of the off-road type. As shown in these drawings, a power unit 2 is located at the center of a body frame 1 and includes an engine 3 and a speed change gear 4 having a built-in clutch mounted therein. A drive sprocket wheel 6 is fitted in an integral relationship on an output power shaft 5 of the speed change gear 4.

Figure 1:
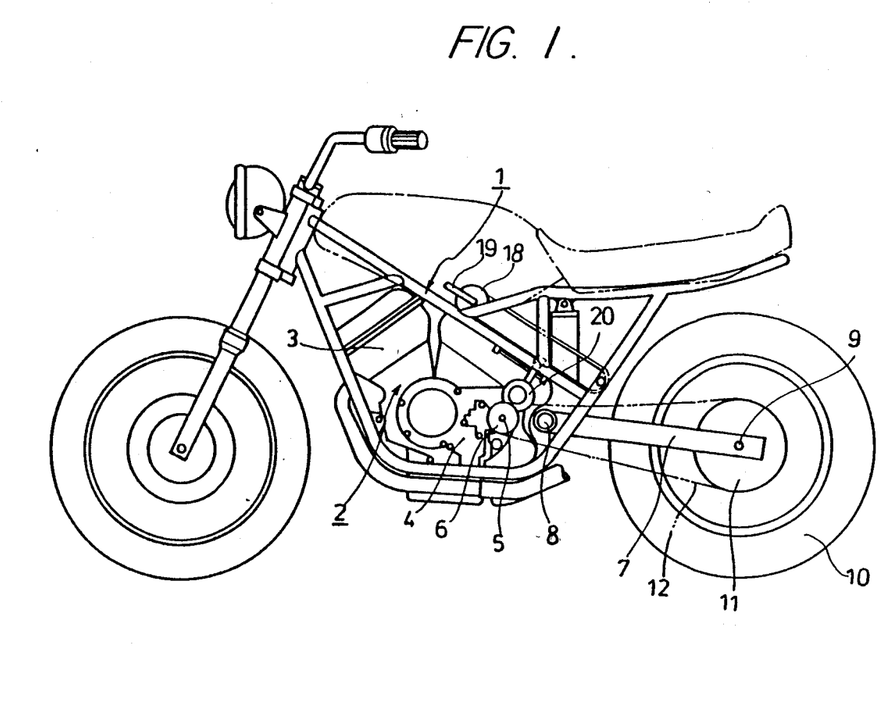
FIG. 1 is an elevational view of an autobicycle incorporating one embodiment of reverse driving device according to the present invention.
Figure 2:
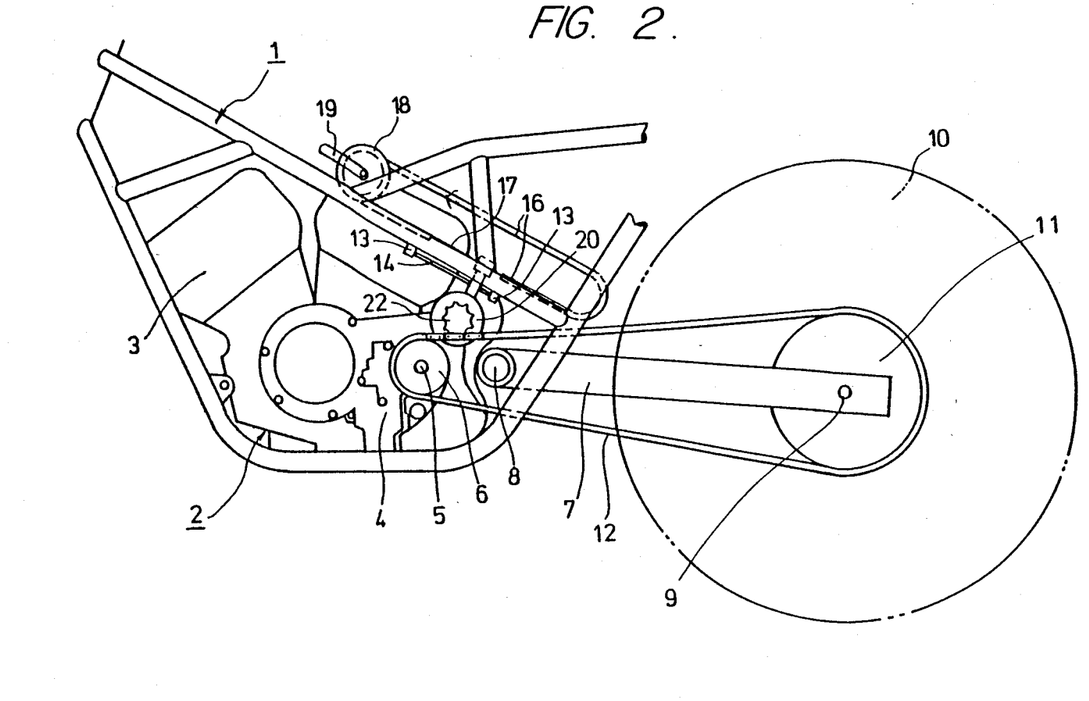
FIG. 2 is an enlarged partial elevational view of the autobicycle of FIG. 1.
Figure 3:
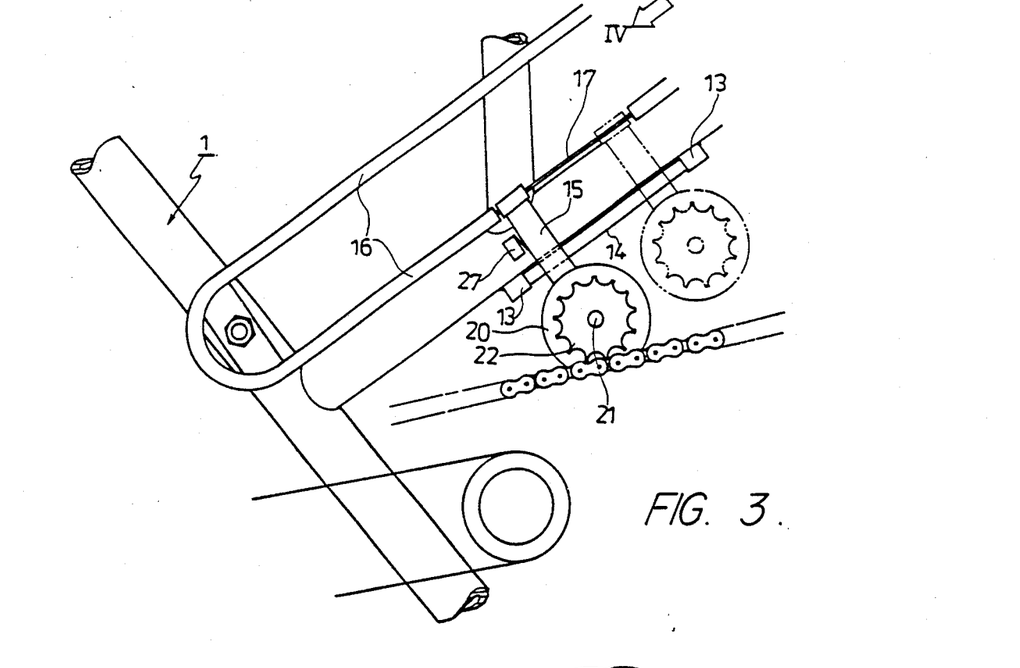
FIG. 3 is a partial elevational view of the driving elements of the autobicycle of FIG. 1.

A rear fork 7 is pivotally mounted at its base end for up and down rocking motion on the body frame 1 by means of a fork pin 8 positioned at a location rearwardly of, and adjacent to, the drive sprocket wheel 6. Rear wheel 10 is supported for rotation on the rear end of the rear fork 7 by means of an axle 9, and a chain 12 extends between a driven sprocket wheel 11 integral with the rear wheel 10 and the drive sprocket wheel 6. Thus, when the engine 3 is operated and the clutch of the speed change gear 4 is engaged with the speed change gear 4 set to a suitable gear ratio, the power of the engine 3 is transmitted to the rear wheel 10 via the speed change gear 4, output power shaft 5, drive sprocket wheel 6, chain 12 and driven sprocket wheel 11 to rotate the rear wheel 10 forwardly to advance the autobicycle.

A pair of front and rear brackets 13 are provided projectingly on the body frame 1 above the output power shaft 5 and the fork pin 8, respectively, and a guide bar 14 is fixedly mounted at opposite ends thereof on the brackets 13. A slider 15 is fitted for sliding movement on the guide bar 14. A guide tube 16 extends in parallel to the guide bar 14, and an endless wire 17 is fitted for sliding movement in the guide tube 16. The endless wire 17 extends around a reverse pulley 18, and the slider 15 is fastened to the endless wire 17. A lever 19 is mounted on the reverse pulley 18 for operating the endless wire 17.

Figure 4:
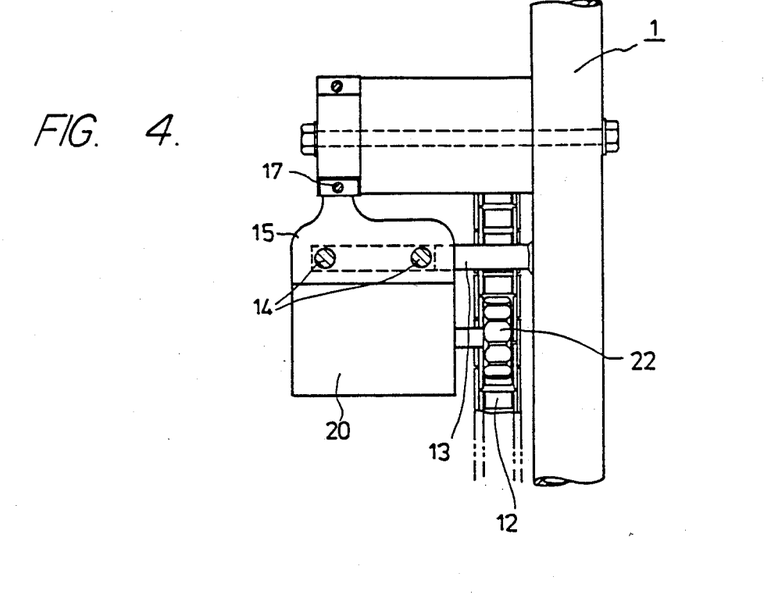
FIG. 4 is a partial view taken in the direction of the arrow IV of FIG. 3.

A reverse driving motor 20 is attached to the slider 15 to be moved therewith, and a reverse sprocket wheel 22 is mounted on a rotary shaft 21 of the reverse driving motor 20.

Figure 5:
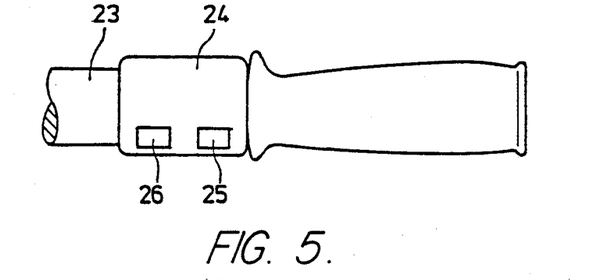
FIG. 5 is a layout view of a reverse actuating switch.

A reverse switch 26 is positioned adjacent a starter switch 25 of a combination switch unit 24 on the handlebar 23. Also, a contact micro-switch 27 is so located on the frame as to be actuated to the open condition by the slider 15 when the reverse sprocket wheel 22 of the reverse driving motor 20 is meshed with the chain 12.

Figure 6:
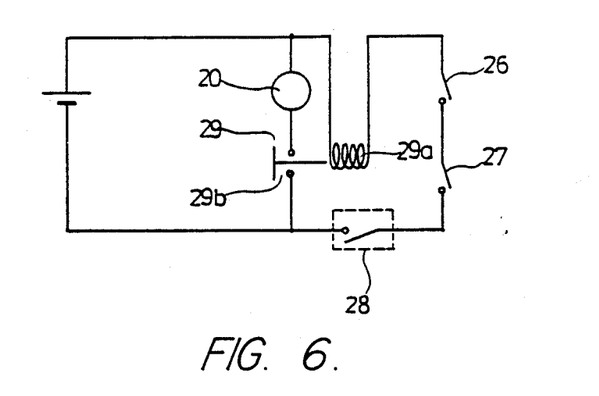
FIG. 6 is a circuit diagram of the electric system employed with the reverse driving device of FIG. 1.
Figure 7:
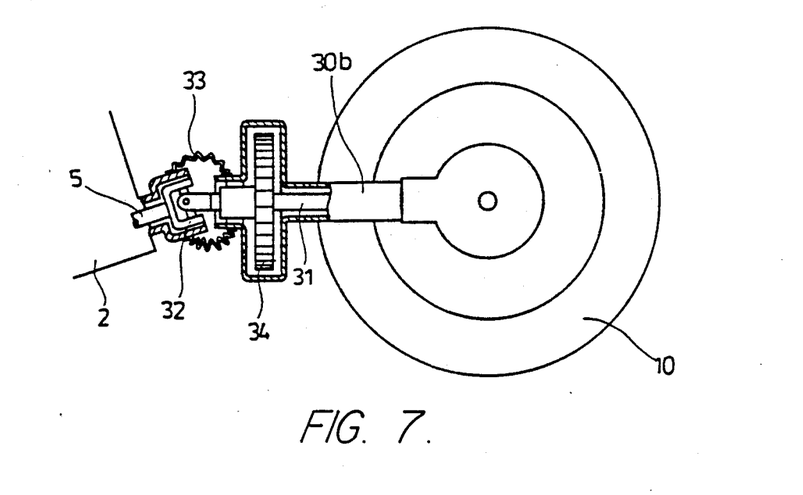
FIG. 7 is a partial side elevational view of another embodiment of the present invention.
Figure 8:
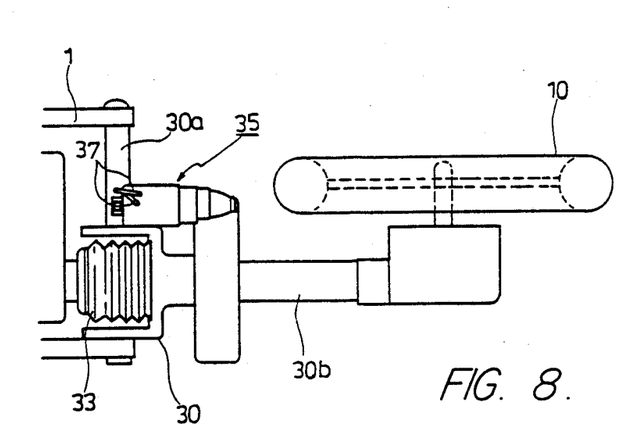
FIG. 8 is partial plan view of the embodiment of FIG. 7.
Figure 9:
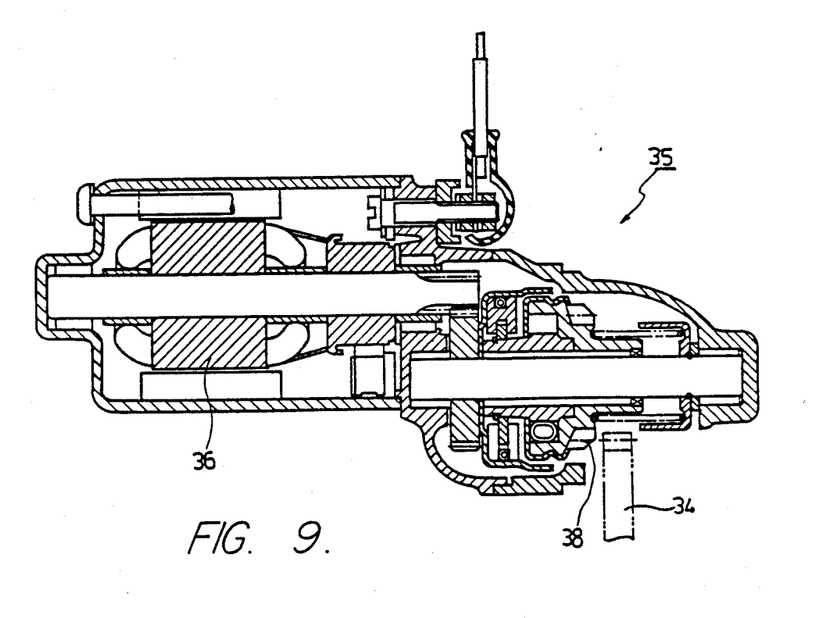
FIGS. 9 and 10 are sectional views of the reverse driving device employed in the embodiment of FIG. 7 with the drive element shown in the engaged and disengaged conditions, respectively.
Figure 10:
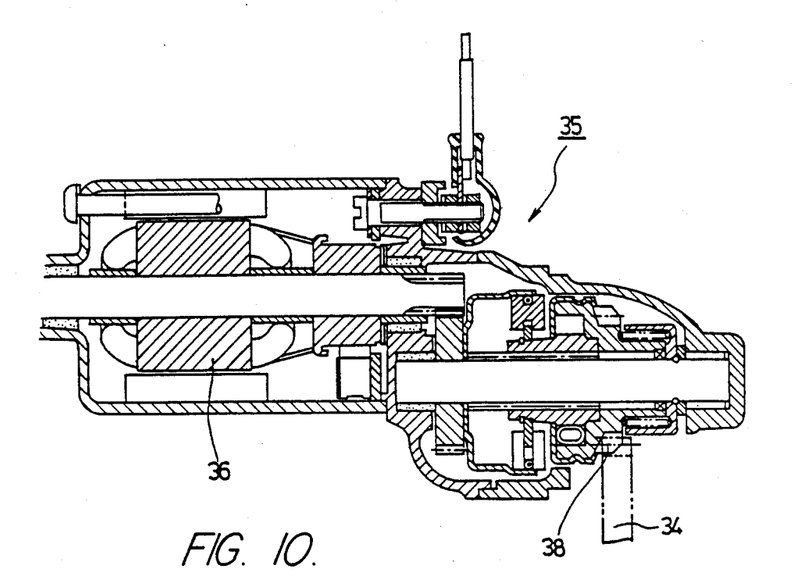

The controlling circuit for the reverse driving motor 20 is as shown in FIG. 6. In particular, the circuit includes a coil 29a of a reverse relay 29, the reverse switch 26, the microswitch 27 and a clutch switch 28 connected in series to a power source. A contact 29b of the reverse relay 29 is connected in series to the power source for the reverse driving motor 20, whereby the motor 20 can be operated only when the clutch switch 28 is turned on indicating that the built-in clutch of the speed change gear 4 is disposed in its disengaged position.

Since the embodiment shown in FIGS. 1 to 6 has the construction described above, if the reverse lever 19 is pivoted forwardly from an upright position, the endless wire 17 is moved in a counterclockwise direction as depicted in FIG. 2 so that the reverse sprocket wheel 22 is caused to mesh with the chain 12 and the microswitch 27 is actuated to its "on" condition. In this condition, if the reverse switch 26 is turned on and the clutch of the speed change gear 4 is operated to its disengaged position thereby to turn the clutch switch 28 on, the coil 29a of the reverse relay 29 is energized to move the associated armature so that the contact 29b of the reverse relay 29 is closed. Consequently, the reverse driving motor 20 is rotated in the counterclockwise direction as viewed in FIG. 2 to cause the chain 12 to move in the clockwise direction. Consequently, the autobicycle is driven reversely.

Alternatively, if the reverse lever 19 is pulled up from the forward positon to move the slider 15 forwardly, the micro-switch 27 is deactuated to terminate operation of the reverse driving motor 20 and the reverse sprocket 22 is disengaged from the chain 12 to separate the reverse driving motor 20 independently of circulation of the chain 12 while power is transmitted from the engine 3 to the rear wheel 10.

Further, if, while the autobicycle is being reversely driven, the clutch of the speed change gear 4 is activated or the reverse switch 26 is deactuated, the associated contacts in the circuit of FIG. 6 will be opened thereby to terminate operation of the reverse driving motor and operation of the autobicycle in reverse.

Furthermore, if the reverse lever 19 is pivoted upwardly to move the slider 15 forwardly, the reverse sprocket wheel 22 is thereby moved sufficiently away from the chain 12. Accordingly, even if the rear fork 7 would be rocked up and down by a great amount, the reverse sprocket wheel 22 will not be contacted with the chain 12.

It will be appreciated that, due to the described arrangement, while the autobicycle is being driven forwardly, the reverse sprocket wheel 22 is incapable of contacting the chain 12. Accordingly, there is no increase in driving resistance caused by the reverse driving system.

In the embodiment of the invention shown in FIGS. 7 to 10 a front pipe portion 30a of a substantially L-shaped hollow rear fork 30 is supported for up and down rocking motion at a lower rear end of the body frame 1, and a drive shaft 31 is fitted for rotation in the rear pipe portion 30b of the rear fork 30. The forward end of the drive shaft 31 and the rear end of the power output shaft 5 are connected to each other by way of a universal coupling 32 which is enclosed in a boot 33 made of a rubber material. The rear end of the drive shaft 31 is connected to the rear wheel 10 by way of a bevel gear (not shown) so that, as the power output shaft 5 rotates, the rear wheel 10 is rotated forwardly to drive the autobicycle forwardly.

A driven gear 34 is formed integrally on the drive shaft 31, and a reverse driving motor unit 35 is located for engagement with the driven gear 34. The reverse driving motor unit 35 is fixed to the rear fork 30 and has the same structure as a starting device of the inertia plunging type such as is described in U.S. Pat. No. 4,325,265 to Wakatsuki et al., the disclosure of which is incorporated herein by reference. Two wires 37 for feeding power to the motor 36 for driving the unit 35 extends through the front pipe portion 30a of the hollow rear fork 30 and are connected at their other end to a power source. Thus, as the motor 36 of the reverse driving motor unit 35 is energized, a pinion 38 is ejected into meshing engagement with the driven gear 34 so that the rear wheel 10 is rotated reversely to drive the autobicycle in the reverse direction.

Since the embodiment shown in FIGS. 7 to 10 does not require movement of the reverse driving motor unit 35, it is very simple in structure. Furthermore, since the reverse driving motor unit 35 is provided on the rear fork 30, the inertia mass of the unit can be reduced by mounting the motor in the vicinity of the swing arm so that riding comfort can be improved as compared with the first embodiment arrangement wherein the reverse driving motor 20 is disposed on the body frame 1.

Figure 11:
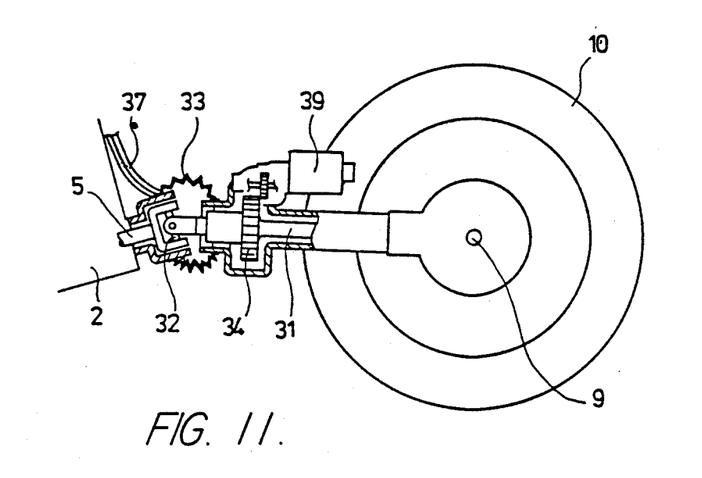
FIG. 11 is a partial elevational view of yet another embodiment of the present invention.
Figure 12:
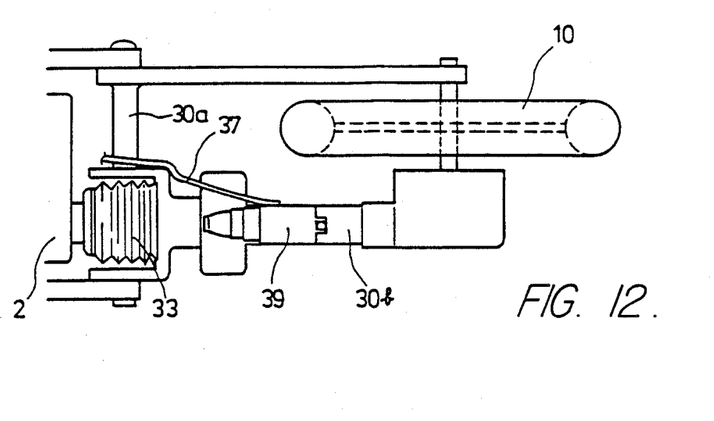
FIG. 12 is a plan view of the embodiment of FIG. 11.

Alternatively, while in the embodiment shown in FIGS. 7 to 10 the reverse driving motor unit 35 is located on the front pipe portion 30a of the rear fork 30, the reverse driving motor unit 35 may otherwise be located on the rear pipe portion 30b of the rear fork 30 as shown FIGS. 11 and 12.

Figure 13:
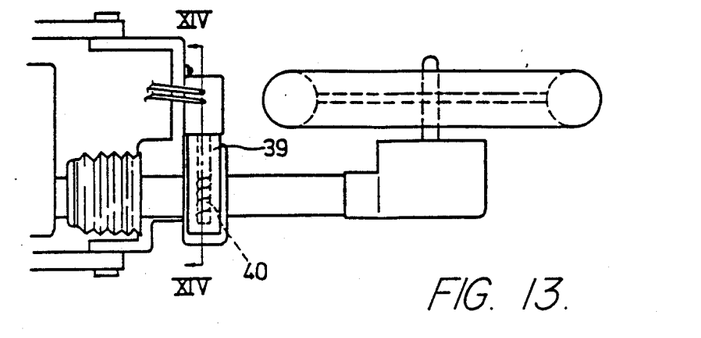
FIG. 13 is a partial plan view of still another embodiment of the present invention.
Figure 14:
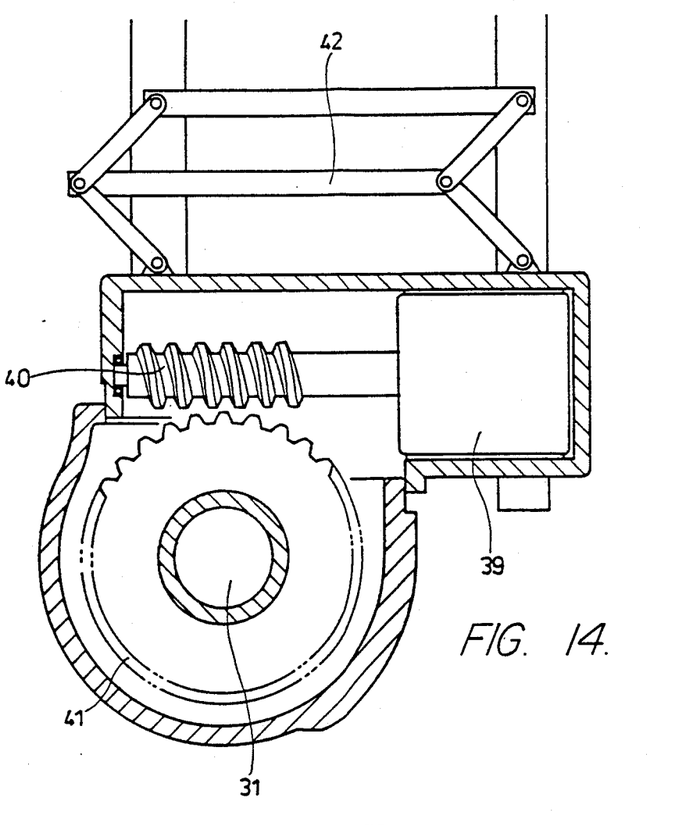
FIG. 14 is a sectional view taken along line XIV—XIV of FIG. 13.

Furthermore, a modification such as is shown in FIGS. 13 and 14 is also possible wherein a worm 40 is provided on the output side of a reverse driving motor unit 39 mounted on the body frame 1 by means of a lifting mechanism 42 for movement toward and away from a worm wheel 41 that is integral with a drive shaft 31. When the autobicycle is to be driven reversely, the reverse driving motor 39 is moved to bring the worm 40 thereon into engagement with the worm wheel 41 in order to drive the autobicycle reversely with a high gear ratio.

Figure 15:
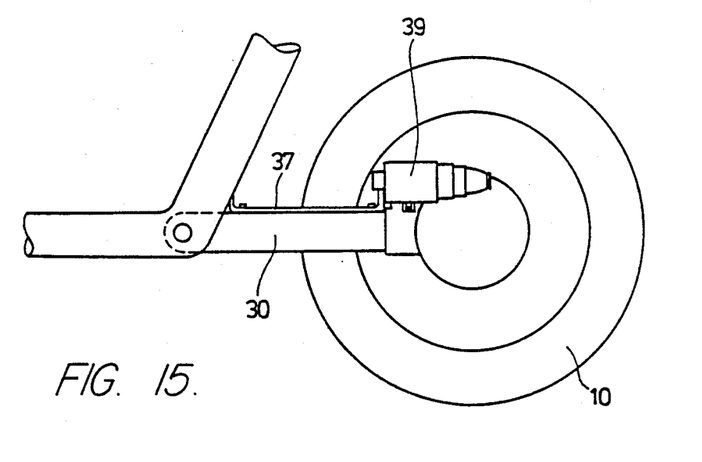
FIG. 15 is an elevational view of a still further embodiment of the invention.

Still further, it is also possible to locate the reverse driving motor unit 39 near the rear end of the rear fork 7, as shown in FIG. 15, such that the worm 40 thereon may be disengageably operated with a worm wheel (not shown) which is integral with a rear wheel 10.

It will be appreciated that, by means of the present invention, an autobicycle can be driven reversely by the driving force of a reverse driving motor without using a starter motor. Accordingly, the reverse driving device of the present invention can readily be applied to existing autobicycles without need for considerable reconstruction of the power unit thereof and without involving a considerable increase in cost.

It should be further understood that, although preferred embodiments of the invention have been illustrated and described herein, changes and modifications can be made in the described arrangements without departing from the scope of the appended claims.

What is claimed is:

1. A reverse driving device for an autobicycle having an engine, a starter motor for said engine, a driving wheel, a power transmission system operably connecting said engine to said driving wheel characterized in that said reverse driving device comprises a reverse driving motor separate from said engine and said starter motor; a coupling means in said power transmission system for selectively replacing, by disconnectably coupling, said engine with said reverse driving motor in operating relation with said power transmission system, said coupling means being effective to operatively couple said reverse driving motor to said power transmission system only when said autobicycle is to be driven reversely.

2. A reverse driving device for an autobicycle according to claim 1, characterized in that said reverse driving motor is mounted at a portion of a rear fork near a location at which said rear fork is supported for pivotal motion.

3. A reverse driving device for an autobicycle according to claim 2, characterized in that two positive and negative feed lines are provided for said reverse driving motor and extend to a battery through a member of the rear fork pivot.

4. A reverse driving device for an autobicycle according to claim 1, characterized in that said reverse driving motor is slidably mounted on the frame of said autobicycle.

5. A reverse driving device for an autobicycle according to claim 4, characterized in that said means for selectively operating said reverse driving motor includes a wire member for sliding said driving motor by a control lever which is controllable at a riding position on said autobicycle.

6. A reverse driving device for an autobicycle having an engine, a starter motor for said engine, a driving wheel, a power transmission system operably connecting said engine to said driving wheel characterized in that said reverse driving device comprises a reverse driving motor separate from said engine and said starter motor connected to said power transmission system near a rear wheel of said autobicycle; and means for selectively replacing said engine with said reverse driving motor in operating relation with said power transmission system including a series circuit electrically connecting said reverse driving motor and comprising a switch actuated to close by disengagement of said engine from said driving wheel and a selectively actuable reverse switch accessible to a rider of said autobicycle.

7. A reverse driving device for an autobicycle according to claim 6, characterized by a switch provided in said series circuit actuable when said reverse driving motor engages said power transmission system.

8. A reverse driving device for an autobicycle having an engine, a starter motor for said engine, a driving wheel, and an endless chain power transmission system operably connecting said engine to said driving wheel characterized in that said reverse driving device comprises a movable reverse driving motor separate from said engine and said starter motor and having a sprocket for driving engagement with said chain, guide means fixed to said autobicycle for guiding movement of said reverse driving motor to and from an operating position with respect to said chain; and means for selectively moving said reverse driving motor along said guide means.

9. The autobicycle according to claim 8 in which said guide means includes a wire attaching said reverse driving motor; a pulley remote from said reverse driving motor operably connecting said wire; and means for rotating said pulley to move said reverse driving motor to and from its operating position with respect to said chain.

10. The autobicycle according to claim 8 in which said guide means includes a wire attaching said reverse driving motor; a pulley remote from said reverse driving motor operably connecting said wire; and means for rotating said pulley to move said reverse driving motor to and from its operating position with respect to said chain.

11. A reverse driving device for an autobicycle having an engine, a starter motor for said engine, a driving wheel, a power transmission system operably connecting said engine to said driving wheel characterized in that said reverse driving device comprises a reverse driving motor separate from said engine and said starter motor and connecting with said power transmission system at a location adjacent said driving wheel; and means for selectively replacing said engine with said reverse driving motor in operating relation with said power transmission system.

12. A autobicycle having an engine, a driving wheel, an endless chain operably connecting said engine to said driving wheel and means for driving said autobicycle in reverse comprising a movable reverse driving motor separate from said engine and having a sprocket for driving engagement with said chain, and means fixed to said autobicycle for guiding movement of said reverse driving motor to and from an operating position with respect to said chain.

* * * * *

UNITED STATES PATENT AND TRADEMARK OFFICE
CERTIFICATE OF CORRECTION

PATENT NO. : 4,923,028
DATED : May 8, 1990
INVENTOR(S) : Shoji YAMASHITA et al.

It is certified that error appears in the above-identified patent and that said Letters Patent is hereby corrected as shown below:

COLUMN 6

Renumber claim 10 as claim 12 and in line 1 thereof, change "8" to -- 11 --.

Renumber claim 11 as claim 10.

Renumber claim 12 as claim 11.

Signed and Sealed this

Thirteenth Day of April, 1993

Attest:

STEPHEN G. KUNIN

*Attesting Officer*   Acting Commissioner of Patents and Trademarks